(12) United States Patent
Goldenberg et al.

(10) Patent No.: US 11,201,990 B2
(45) Date of Patent: *Dec. 14, 2021

(54) MAGNIFIER DEVICE WITH ADJUSTABLE CAMERA

(71) Applicant: Freedom Scientific, Inc., Clearwater, FL (US)

(72) Inventors: Michael Goldenberg, Melbourne, FL (US); Carlos M. Rodriguez, Palm Harbor, FL (US); Bradley S. Davis, Treasure Island, FL (US); Patrick Murphy, Lithia, FL (US); Todd Conard, Ruskin, FL (US); Waldemar H. Tunkis, Palm Harbor, FL (US)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,667

(22) Filed: Dec. 17, 2019

(65) Prior Publication Data
US 2020/0128156 A1 Apr. 23, 2020

Related U.S. Application Data

(63) Continuation of application No. 15/441,843, filed on Feb. 24, 2017, now Pat. No. 10,511,749.

(60) Provisional application No. 62/300,268, filed on Feb. 26, 2016.

(51) Int. Cl.
*H04N 7/18* (2006.01)
*H04N 5/225* (2006.01)
*G09B 21/00* (2006.01)
*H04N 5/232* (2006.01)

(52) U.S. Cl.
CPC ......... *H04N 5/2252* (2013.01); *G09B 21/008* (2013.01); *H04N 5/23296* (2013.01)

(58) Field of Classification Search
CPC .. G09B 21/008; H04N 5/2252; H04N 5/2257; H04N 5/23296
See application file for complete search history.

(56) References Cited

U.S. PATENT DOCUMENTS

| | | |
|---|---|---|
| 3,816,646 A | 6/1974 | Cinque |
| 4,387,978 A | 6/1983 | Pizzuti |
| 4,392,732 A | 7/1983 | Pizzuti |

(Continued)

FOREIGN PATENT DOCUMENTS

| | | |
|---|---|---|
| DE | 102011075273 A1 | 11/2012 |
| EP | 1921838 A2 | 5/2008 |

(Continued)

*Primary Examiner* — Jessica M Prince
(74) *Attorney, Agent, or Firm* — GrayRobinson, P.A.; Michael J. Colitz, III

(57) ABSTRACT

Disclosed is a magnification device with multiple orientations. This allows a blind or low vision user to select the best orientation for the task being performed. The device includes both opened and closed orientations. It is further configurable into document reading, near object inspection, far object inspection, and self-inspection modes. The camera of the device can be manipulated by the user depending upon which of these orientations is selected. Furthermore, the camera automatically adjusts itself into one of two pre-set configurations whenever the device is opened or closed.

7 Claims, 5 Drawing Sheets

(56) References Cited

U.S. PATENT DOCUMENTS

| | | |
|---|---|---|
| 5,064,426 A | 11/1991 | Huebsch |
| 5,734,414 A | 3/1998 | Nishimura et al. |
| D454,146 S | 3/2002 | Mori |
| D488,440 S | 4/2004 | Senda |
| D503,944 S | 4/2005 | Adachi et al. |
| 7,170,557 B2 | 1/2007 | Manico et al. |
| 7,295,244 B2 | 11/2007 | Manico et al. |
| 7,336,295 B2 | 2/2008 | Sukenari et al. |
| 7,359,003 B1 | 4/2008 | Knighton et al. |
| 7,825,949 B2 | 11/2010 | Trulaske |
| 8,194,154 B2 * | 6/2012 | Yoon .................. A61F 9/08 348/231.2 |
| 8,681,268 B2 | 3/2014 | Reznik et al. |
| 8,896,741 B2 | 11/2014 | Akagi et al. |
| 9,213,220 B2 | 12/2015 | Fowler et al. |
| 9,992,453 B2 | 6/2018 | Rodriguez et al. |
| 2001/0043166 A1 | 11/2001 | Jacobsen et al. |
| 2001/0045939 A1 | 11/2001 | Myerson et al. |
| 2002/0016191 A1 | 2/2002 | Ijas et al. |
| 2003/0089832 A1 | 5/2003 | Gold |
| 2003/0095200 A1 | 5/2003 | Nagano |
| 2004/0174452 A1 * | 9/2004 | Kinemura .......... H04N 5/2252 348/333.06 |
| 2004/0246340 A1 | 12/2004 | Sukenari et al. |
| 2005/0062847 A1 | 3/2005 | Johnston |
| 2005/0122396 A1 | 6/2005 | Mizukami et al. |
| 2005/0168627 A1 | 8/2005 | Yi et al. |
| 2005/0201047 A1 | 9/2005 | Krah |
| 2005/0243073 A1 | 11/2005 | Hashimoto et al. |
| 2005/0253959 A1 | 11/2005 | Nakamura |
| 2006/0121940 A1 | 6/2006 | Kong et al. |
| 2006/0203093 A1 | 9/2006 | Trulaske |
| 2007/0296845 A1 | 12/2007 | Watanabe et al. |
| 2009/0002548 A1 * | 1/2009 | Lian ............................... 348/373 |
| 2009/0059038 A1 | 3/2009 | Seakins et al. |
| 2009/0093274 A1 | 4/2009 | Yamamoto |
| 2009/0244363 A1 | 10/2009 | Sugimura et al. |
| 2010/0026854 A1 | 2/2010 | Rodriguez et al. |
| 2010/0026855 A1 | 2/2010 | Conard et al. |
| 2010/0208123 A1 | 8/2010 | Akagi et al. |
| 2011/0074940 A1 | 3/2011 | Goldenberg et al. |
| 2011/0141256 A1 * | 6/2011 | Rodriguez ......... H04N 1/19594 348/63 |
| 2012/0062691 A1 | 3/2012 | Fowler et al. |
| 2012/0113401 A1 | 5/2012 | Yamazaki et al. |
| 2012/0314116 A1 | 12/2012 | Jannard et al. |
| 2013/0148002 A1 | 6/2013 | Kim et al. |
| 2014/0022364 A1 * | 1/2014 | Rodriguez ............. G03B 17/04 348/63 |
| 2014/0078389 A1 | 3/2014 | Merz |
| 2014/0118799 A1 | 5/2014 | Van Der Snoek |
| 2014/0176690 A1 | 6/2014 | Hamel et al. |
| 2015/0304518 A1 | 10/2015 | Diaz |
| 2016/0057322 A1 * | 2/2016 | Murphy ............... H04N 5/2256 348/63 |

FOREIGN PATENT DOCUMENTS

| | | |
|---|---|---|
| JP | 3026273 U | 7/1996 |
| JP | 2004336229 A | 11/2004 |
| JP | 2005326514 A | 11/2005 |
| JP | 2006025087 A | 1/2006 |
| JP | 3773457 B2 | 5/2006 |
| JP | 2009246884 A | 10/2009 |
| JP | 2011530262 A | 12/2011 |
| WO | 2010017121 A3 | 4/2010 |

* cited by examiner

MAGNIFIER DEVICE WITH ADJUSTABLE CAMERA

CROSS REFERENCE TO RELATED APPLICATIONS

This application is a continuation of, and claims priority to, application Ser. No. 15/441,843, filed on Feb. 24, 2017, entitled "Magnifier Device With Adjustable Camera," now U.S. Pat. No. 10,511,749, issued Dec. 17, 2019, which itself claims priority to Provisional Patent Application Ser. No. 62/300,268 filed on Feb. 26, 2016, entitled "Magnifier Device with Adjustable Camera." The contents of these applications are fully incorporated herein for all purposes.

TECHNICAL FIELD

This invention relates to a magnification device for individuals with low vision. More particularly, the present invention relates to a portable magnification device that has a variety of discrete configurations and that includes a camera, the position of which is reset depending upon the selected configuration of the device.

BACKGROUND OF THE INVENTION

The use of portable magnifiers for low vision users is known in the art. To date, however, these magnifiers have been heavy, bulky, and cumbersome to use. Additionally, many of these magnifiers have only one mode of operation, a mode that requires the user to hold the device at a fixed distance above the object being viewed.

Additionally, many magnifiers that are designed to be placed upon the object to be viewed typically leave little or no room over top of the object. This prohibits the user from interacting with the object being viewed. For instance, if the object is a document, a user cannot write upon the document while it is being magnified.

What is needed, then, is a magnifier with multiple configurations and modes of operation, whereby a user can use the magnifier by either holding the device over the object or by placing the device upon the object. There is an additional need for a magnifier that allows users to interact with the object while it is being magnified. There is also a need in the art for a portable magnifier that has a compact closed orientation that protects the magnifier when it is not in use.

There is a further need in the art for a magnification device with a camera that is automatically adjusted in response to the selected configuration of the device.

SUMMARY OF THE INVENTION

It is an object of the present disclosure to provide a magnification device with a number of discrete orientations.

It is a further object of the present disclosure to provide a magnification device with a variety of different orientations with the user selecting the desired orientation depending upon the intended use of the magnification device.

It is therefore one of the objectives of this invention to allow a user to configure a magnifier camera that can either be held over an object to be viewed or positioned upon the object to be viewed.

It is a further object of the present disclosure to provide a magnification device with a camera that orients itself automatically depending upon the selected configuration of the device.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

The present disclosure relates to a magnification device with multiple orientations. This allows a blind or low vision user to select the best orientation for the task being performed. The device includes both opened and closed orientations. It is further configurable into document reading, near object viewing, far object viewing, and self-inspection modes. The camera of the device can be manipulated by the user depending upon which of these orientations is selected. Furthermore, the camera automatically adjusts itself into one of two pre-set configurations whenever the device is opened or closed. The various components of the preset disclosure, and the manner in which they interrelate, are described in greater detail hereinafter.

Figure 1:
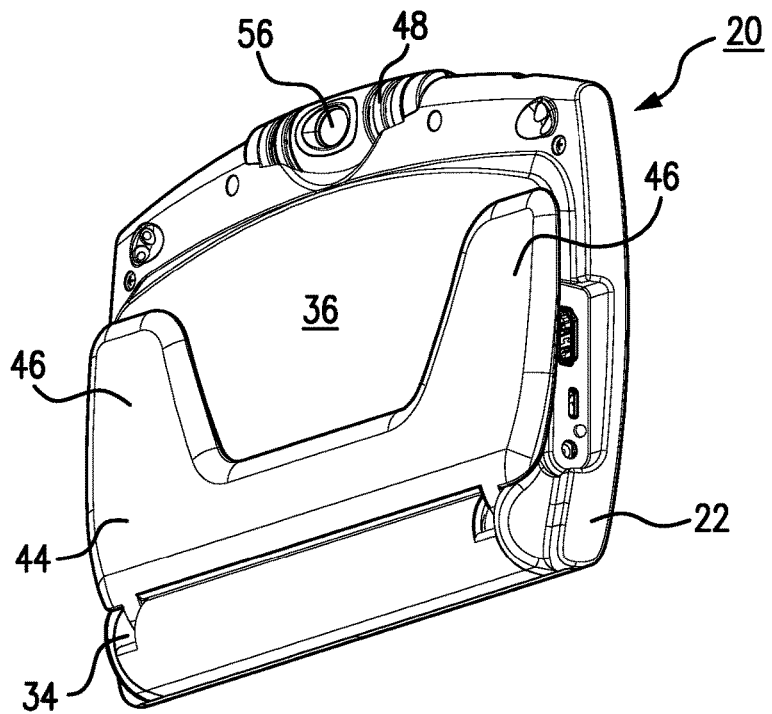
FIG. 1 is a perspective view of the magnification device in the distant object viewing orientation.
Figure 6:
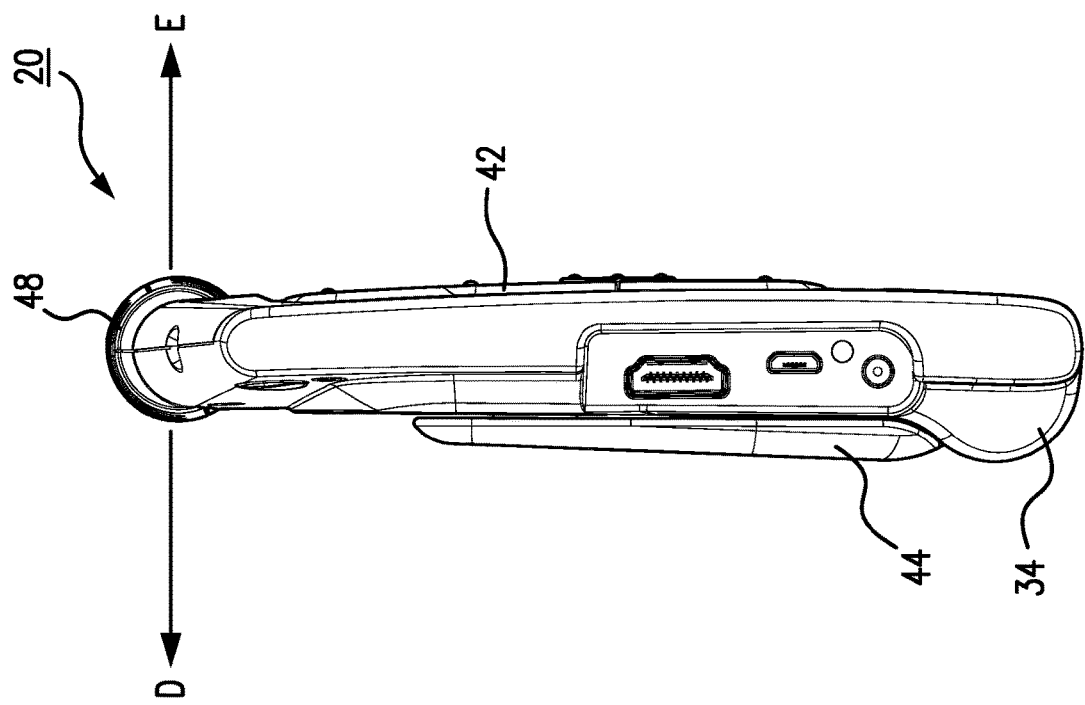
FIG. 6 is a side elevational view of the magnification device in the closed orientation and showing the distant object camera viewing orientation (D) and self-viewing camera orientation (E).

FIGS. 1-6 illustrate the various configurations of the magnification device (20) of the present disclosure. FIGS. 1 and 6 illustrate the device (20) in the closed orientation with the housing (22) and base (44) in facing relation with one another. This allows the device to be held by the user. FIGS. 2, 3, 4, and 5 illustrate the device (20) in the opened orientation with the housing (22) and base (44) pivoted away from one another. This permits the device (20) to be placed on a table or other surface.

Figure 2:
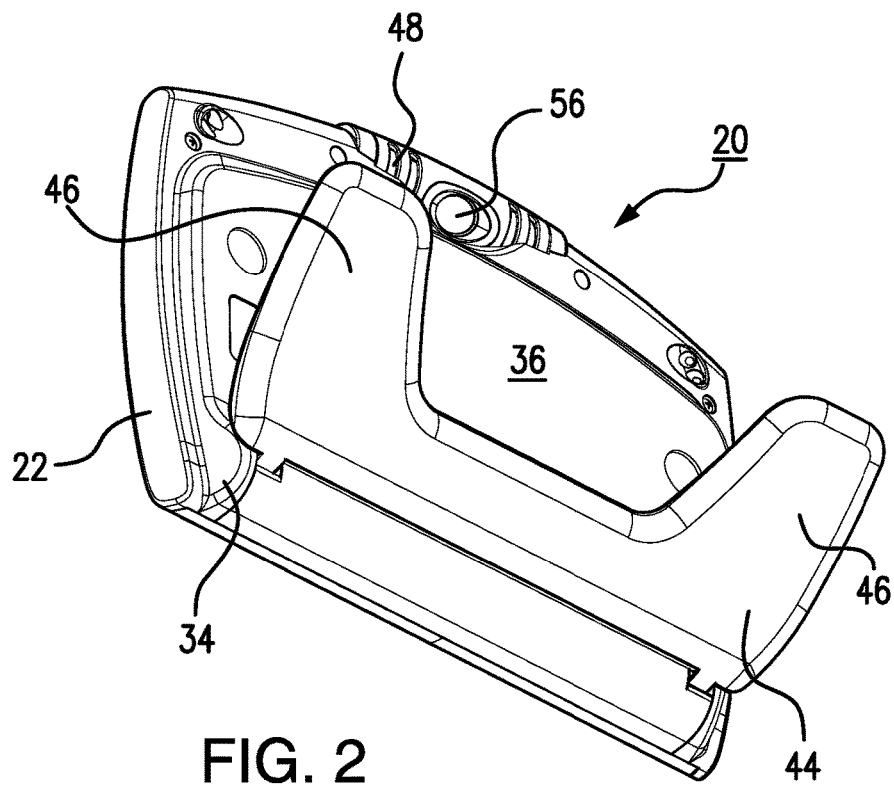
FIG. 2 is a perspective view of the magnification device in the document viewing orientation.
Figure 3:
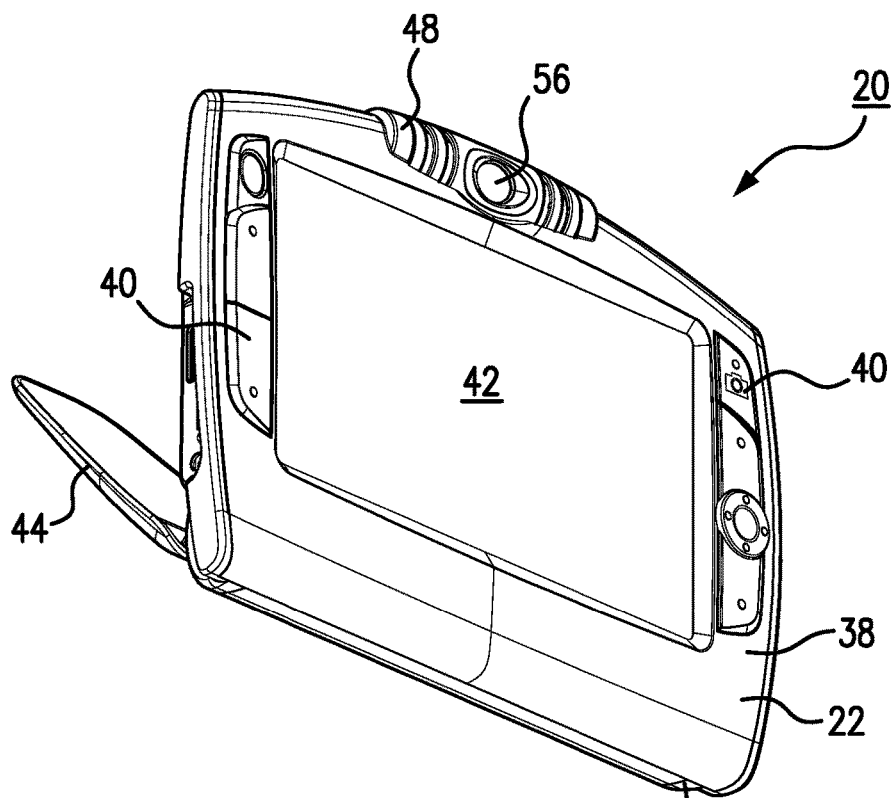
FIG. 3 is a perspective view of the magnification device in the self-viewing orientation.
Figure 4:
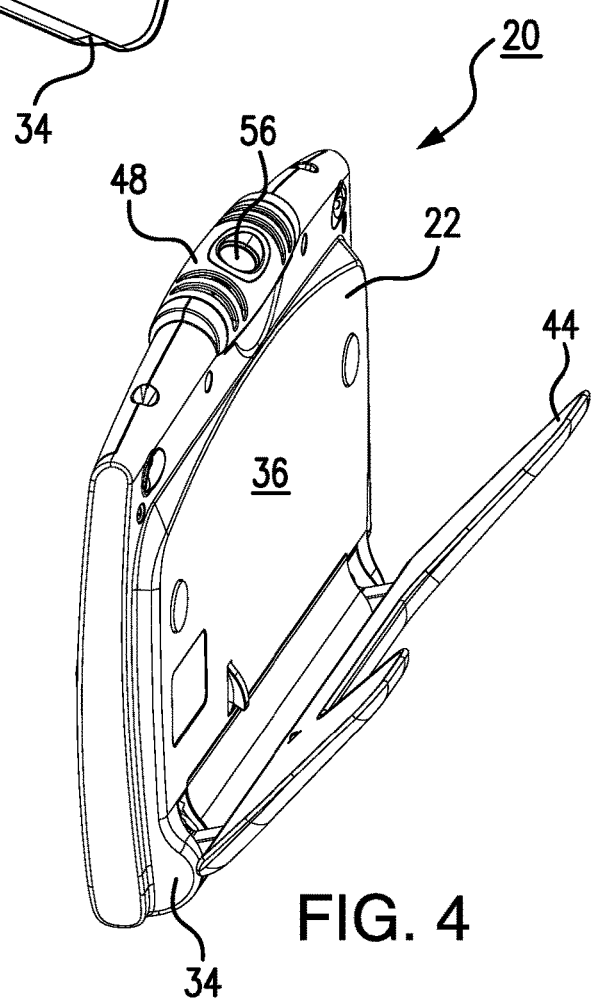
FIG. 4 is a perspective view of the magnification device in the near object viewing orientation.

The video camera (56) of the device (20) can be positioned by the user depending upon the task being performed. FIG. 2 illustrates the document viewing orientation wherein the camera (56) is pointed downwardly to view an object placed on the table. FIG. 4 illustrates a near object viewing orientation wherein camera (56) is angled to view object held in front of the camera (56) by the user. FIG. 3 illustrates the camera (56) in a self-view mode. This allows the user to view themselves on monitor (42). Finally, when in the closed orientation, camera (56) can be pointed to a distant object. This is the distant object viewing orientation. As explained hereinafter, the user can readily manipulate the camera barrel (48) to orient camera (56) into one of these viewing orientations. However, in accordance with the disclosure, camera (56) is automatically reset to the document viewing orientation (FIG. 2) when the device (20) is opened. And camera (56) automatically resets into the distant object viewing orientation when device (20) is closed. The device (20) automatically resets to these positions via the interaction between brake, brake release, and stop mechanisms as elaborated upon hereinafter.

Figure 8:
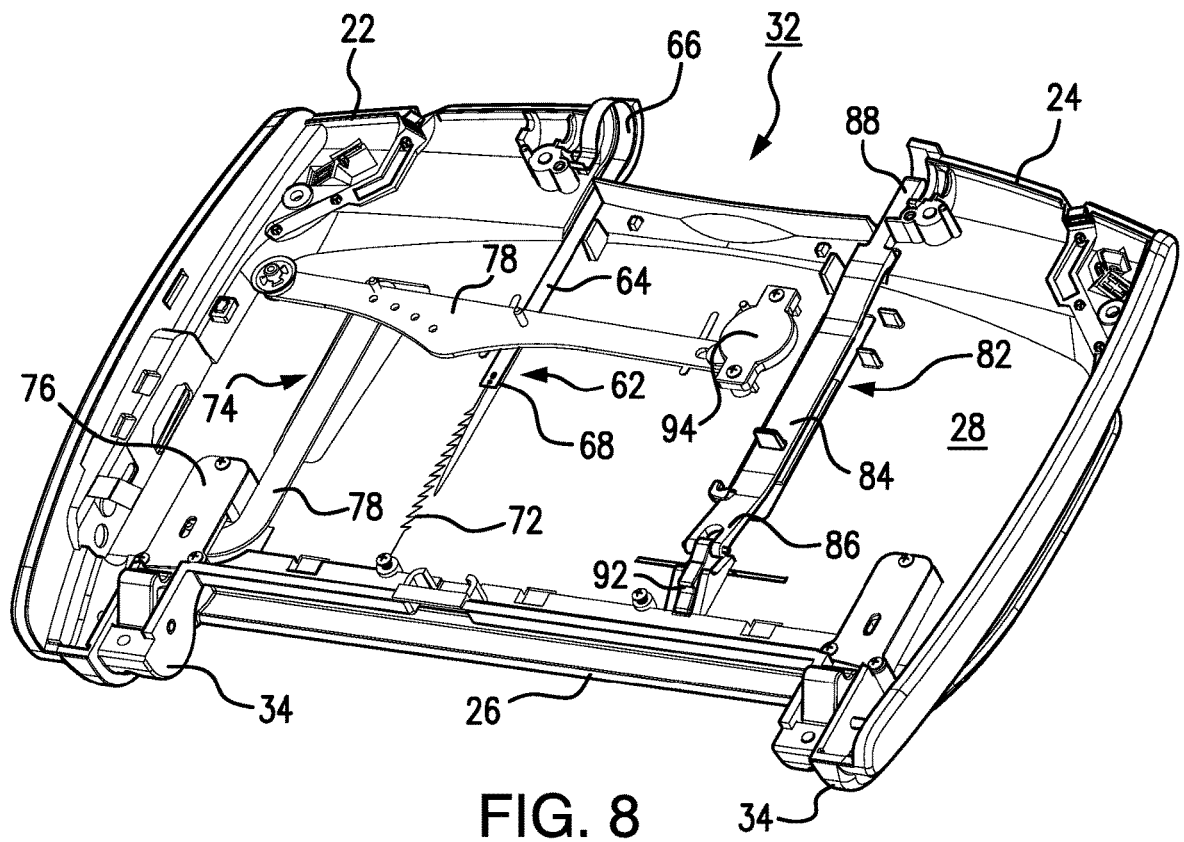
FIG. 8 is a view of the internal components of the housing of the magnification device.
Figure 9:
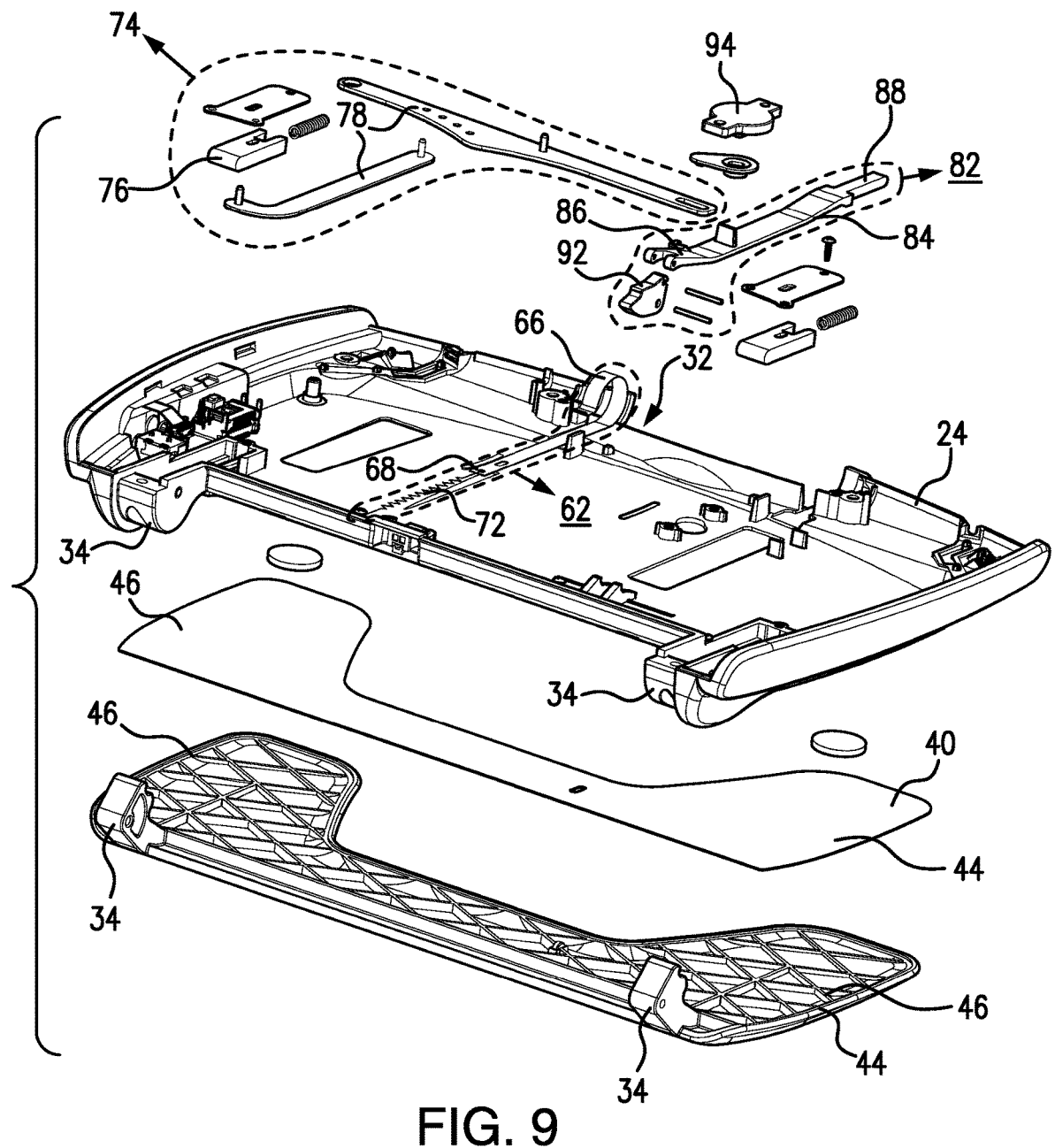
FIG. 9 is an exploded view of the internal components of the housing of the magnification device.

FIG. 8 is a detailed view of housing (22) and shows the top edge (24), a bottom edge (26), and an interior (28) of the housing (22). As illustrated, housing (22) includes a recess (32) formed within the top edge (24). A hinge (34) is positioned along the bottom edge (26). Housing (22) is further defined by a front face (36) and a back face (38). A video screen (42) is positioned within the back face (38). Video screen (42) permits the user to view images of objects taken by camera (56). A video processor (not shown) can be included within the interior (28) of housing (22). As in known in the art, video processor allows the images taken by camera (56) to be greatly enlarged to assist viewing by blind or low vision users.

Housing (22) includes a pivotally attached base (44). In the preferred embodiment, base (44) includes two spaced apart feet (46). This creates an intervening space where objects to be view can be placed. Base (44) is pivotally connected to the bottom edge (26) of the housing (22) by way of the hinge (34). Device (20) thus has first and second orientations. In the first (or opened) orientation, housing (22) and base (44) are at an angle with respect to one another. This angle can range from less than 90 degrees to greater than 10 degrees. This configuration allows base (44) to rest upon a surface, such as a table or desk. The angular position of housing (22) is chosen to suit the viewing needs of the user. In the second (or closed) orientation, housing (22) and base (44) are in contact with one another. This is also known as the hand held mode, as this configuration allows device (20) to be more easily manipulated by the user.

Figure 5:
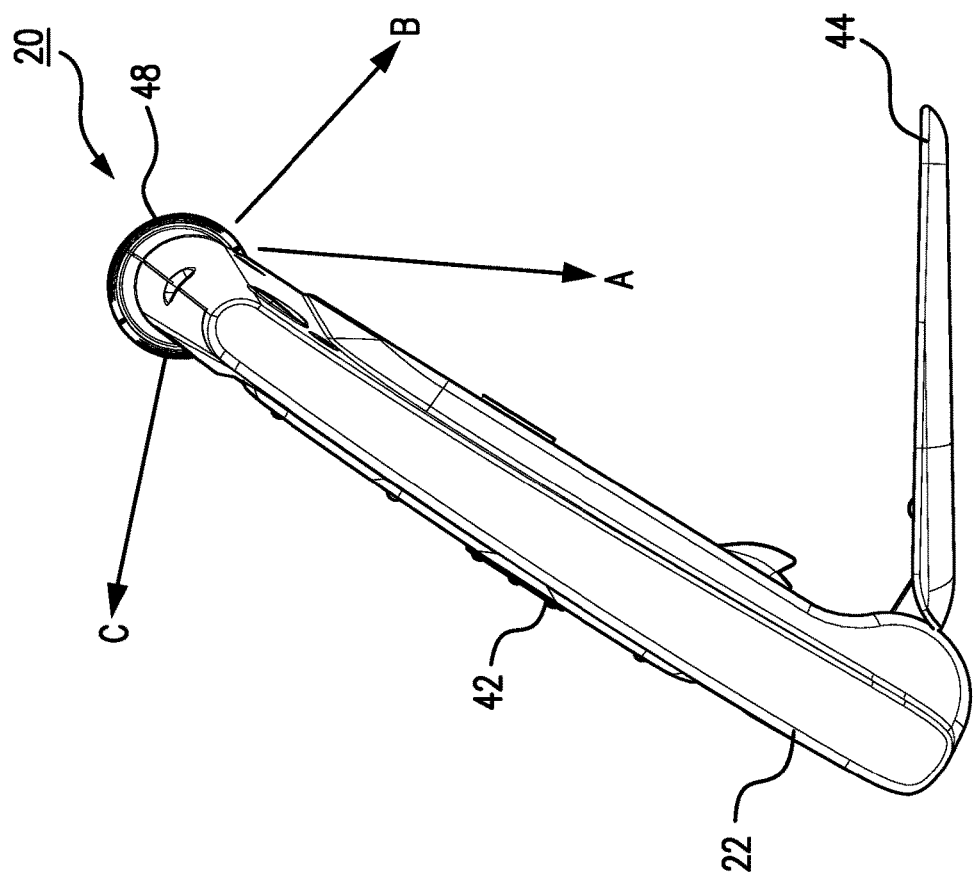
FIG. 5 is a side elevational view of the magnification device in the opened orientation and showing the document viewing camera orientation (A), the near object viewing camera orientation (B), and the self-viewing camera orientation (C).
Figure 7:
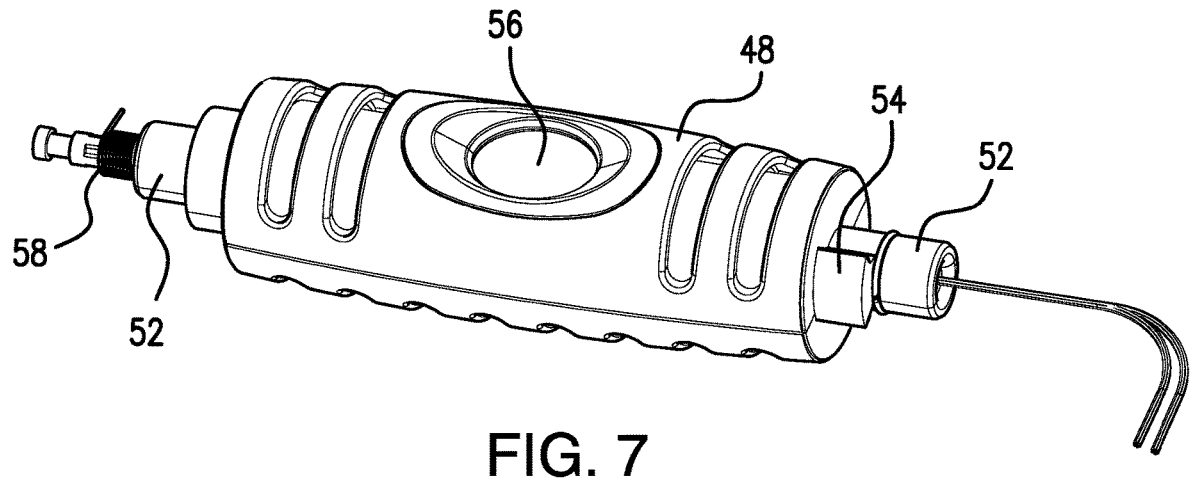
FIG. 7 is a detailed view of the camera barrel assembly.

The camera barrel (48) is next described in connection with FIG. 7. Camera barrel (48) includes opposing axles (52) that allow the barrel (48) to be pivotally mounted within recess (32) of housing (22). Barrel (48) further includes a catch (54) that is positioned about one of the opposing axles (52). The function of this catch (54) is described in greater detail hereinafter. A video camera (56) is housed within the barrel (48). As noted by Arrow A in FIG. 5, barrel (48) has a document viewing orientation. Arrow B in FIG. 5 shows the near object viewing orientation of barrel (48). Arrow D in FIG. 6 shows the distant object viewing orientation of barrel (48). Finally, Arrow C in FIG. 5 and Arrow E of FIG. 6 show the self-view orientation of barrel (48). Thus, barrel (48) has a different angular orientation in each of the different viewing orientations. Barrel (48) includes a torsion spring (58) associated with one of the opposing axles (52). This torsion spring (58) functions to initially rotate the barrel (48) into a forward most position. If the device (20) is opened, this forward most position corresponds to the document view orientation, and if device (20) is closed this forward most position correspond to the distant object viewing orientation.

The camera barrel (48) can preferably be manipulated by the user into one of the foregoing orientations. This is accomplished by way of a brake mechanism (62). Brake mechanism ensures that once a desired angular orientation is selected, the barrel (48) will maintain that orientation. Brake mechanism (62) operates via the interaction of two spring forces. In particular, brake (62) counterbalances the force of the torsion spring (58). As illustrated in FIG. 8, brake (62) is positioned within the interior (28) of the housing (22) and includes a band (64) with first and second ends (66 and 68). The first end (66) of the band (64) is fitted about one of the opposing axles (52) of the barrel (48). Preferably, band (64) is fitted about the axle at a point adjacent torsion spring (58). A coil spring (72) is then connected between the interior (28) of the housing (22) and the second end (68) of the band (64). The coil spring (72) is selected such that it can generate a sufficient force to fully counteract any rotational forces generated by torsion spring (58). Brake (62) has an engaged position where the force of the coil spring (72) is permitted to counterbalance the force of the torsion spring (58). This allows the angular orientation of the barrel (48) to be adjusted by hand. Brake (62) also has a disengaged position where the torsion spring (58) is permitted to rotate the barrel (48) into the forward most position. As explained below, this forward most position changes depending upon the operation of a stop mechanism.

The brake release mechanism (74) is next described in connection with FIG. 8. Brake release mechanism (74) operates by temporarily releasing the brake (62) and thereby allowing torsion spring to rotate barrel (48) to the forward most position. As illustrated, brake release mechanism (74) is positioned within the interior (28) of the housing (22) and includes a detent (76) within the hinge (34). Brake release mechanism (74) also includes a two bar linkage (78) that serves to interconnect the detent (76) and the band (64). In use, as device (20) is moved into either the opened or closed orientations, the detent (76) causes the band (64) to cycle up and down, whereby the brake (62) is moved between the disengaged and engaged positions. This temporary disengagement of the brake permits the torsion spring (58) to reset the position of the barrel (48) to the forward most position.

The forward most position of the barrel (48) is determined via the operation of a stop mechanism (82). More specifically, stop mechanism (82) limits the forward most position of the barrel (48) depending upon whether the device (20) is in the opened or closed orientation. Stop mechanism (82) is positioned within the interior (28) of the housing (22) and includes a link (84) with a first end (86) and a second end (88). A lever (92) for moving the link (84) upwardly and downwardly is also positioned within the interior (28) of housing (22). One end of lever (92) extends through the front face (36) of the housing (22). Lever (92) is interconnected to the first end (86) of the link (84). The second end (88) of the link (84) is in contact with the catch (54) on the barrel (48). As such, when the device (20) is in the second, or closed, orientation the base (44) contacts the lever (92) to shift the link (84) upwardly. This upward movement of the link, in turn, ensures that the forward most position of the barrel (48) is limited to the distant object viewing orientation. Alternatively, when the device (20) is in the first, or opened, orientation the link (84) shifts downwardly such that the forward most position of the barrel (48) is limited to the document viewing orientation. In this manner, when device (20) is initially opened, camera (56) is initially oriented (or reset) into the document viewing mode. And when device (20) is initially closed, camera (56) is initially oriented (or reset) into the distant object viewing orientation. In either case, the user is subsequently able to manipulate camera barrel (48) into another viewing orientation. However, the resetting of the camera (56) as described ensures the blind or low vision user does not become disoriented when configuring the device (20).

Finally, a rotatory damper (94) is optionally associated with the brake release mechanism (74). The rotatory damper (94) functions by slowing the temporary release of the brake (74). This, in turn, ensures that barrel (48) has sufficient time to achieve the forward most position before the brake is reengaged.

Although in the preferred embodiment, the camera barrel (48) is adjusted mechanically, other adjustment methods are within the scope of the present invention. For example, a proximity sensor can be included within the barrel (48) to determine the approximate distance between the camera (56) and the object being viewed. Depending upon the distance, the barrel (48) can be automatically rotated to the document viewing orientation (A), near object orientation (B), self-view orientation (C, D), or distant object viewing orientation (E).

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A device for displaying magnified images of an object comprising:
    a housing having an interior and opposing faces, a screen positioned within one of the faces;
    a base pivotally connected to the housing, the base having opened and closed configurations with respect to the housing;
    a camera assembly for taking images of the object and displaying the images on the screen, the camera assembly being rotatably mounted within the interior of the housing between first and second positions, a spring with a spring force, the spring interconnected to the camera assembly, the spring force urging the camera assembly into the first position;
    a stop mechanism positioned within the interior of the base, the stop mechanism being slidable between upper and lower positions within the housing, whereby positioning the stop mechanism in the upper position prevents the camera assembly from rotating to the first position, and whereby positioning the stop mechanism in the lower position allows the camera assembly to rotate to the first position;
    a brake for selectively counterbalancing the spring force, the brake positioned within the interior of the housing and including a band with first and second ends, the first end of the band fitted to the camera assembly and the second end of the band interconnected to the interior of the housing, the brake having an engaged position where the brake counterbalances the spring force to permit the position of the camera to be adjusted by hand, the brake also having a disengaged position wherein the spring force is permitted to rotate the camera assembly.

2. The device as described in claim 1 wherein placing the base into the opened configuration causes the stop mechanism to slide to the lower position.

3. The device as described in claim 1 wherein placing the base into the closed configuration causes the stop mechanism to slide to the upper position.

4. The device as described in claim 1 wherein the base comprises two spaced feet.

5. The device as described in claim 4 wherein the camera assembly is pointed between the spaced feet when in the first position.

6. The device as described in claim 1 wherein the screen is positioned within a front side of the housing and the camera assembly has a self-viewing orientation allowing for objects located on the front side of the housing to be imaged.

7. The device as described in claim 1 further comprising a coil spring connected between the interior of the housing and the second end of the band, wherein the force of the coil spring is used to counterbalance the spring force when the brake is engaged.

* * * * *